(12) United States Patent
Boies et al.

(10) Patent No.: US 9,747,279 B2
(45) Date of Patent: Aug. 29, 2017

(54) CONTEXT CARRYOVER IN LANGUAGE UNDERSTANDING SYSTEMS OR METHODS

(71) Applicant: Microsoft Technology Licensing, LLC, Redmond, WA (US)

(72) Inventors: Daniel Boies, Montreal (CA); Ruhi Sarikaya, Redmond, WA (US); Zhaleh Feizollahi, Seattle, WA (US); Puyang Xu, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/698,400

(22) Filed: Apr. 28, 2015

(65) Prior Publication Data

US 2016/0307567 A1 Oct. 20, 2016

Related U.S. Application Data

(60) Provisional application No. 62/148,745, filed on Apr. 17, 2015.

(51) Int. Cl.
*G06F 17/27* (2006.01)
*G10L 15/183* (2013.01)
(Continued)

(52) U.S. Cl.
CPC ........ *G06F 17/279* (2013.01); *G06F 17/2785* (2013.01); *G10L 15/183* (2013.01); *G10L 15/22* (2013.01); *G10L 15/30* (2013.01)

(58) Field of Classification Search
CPC ... G10L 15/22; G10L 15/183; G10L 15/1822; G10L 15/19; G10L 15/193; G10L 15/30; G10L 12/265; G10L 15/08; G10L 15/265; G10L 15/197; G10L 15/1815; G10L 25/87; G10L 25/51; G10L 2015/223;
(Continued)

(56) References Cited

U.S. PATENT DOCUMENTS 6,622,119 B1   9/2003 Ramaswamy et al.
7,257,537 B2   8/2007 Ross et al.
(Continued)

OTHER PUBLICATIONS

Senef et al., "Exploiting Context Information in Spoken Dialogue Interaction with Mobile Devices", In Proceedings of International Workshop on Improved Mobile User Experience, published May 13, 2007, 11 pgs.
(Continued)

*Primary Examiner* — Vu B Hang

(57) ABSTRACT

Systems and methods for determining a user intent or goal for contextual language understanding by utilizing information from one or more previous user natural language inputs and one or more previous system generated responses to the user natural language inputs are provided. More specifically, the systems and methods utilize a common schema for determining features from the responses and natural language inputs and provide carryover tracking between responses and the natural language inputs. Accordingly, the systems and methods for contextual language understanding provide for a more accurate, a more reliable, and a more efficient context carryover and goal tracking system when compared to systems and methods that do not utilized the responses in determining the user goal/intent.

20 Claims, 9 Drawing Sheets

(51) Int. Cl.
*G10L 15/30* (2013.01)
*G10L 15/22* (2006.01)

(58) Field of Classification Search
CPC ............. G06F 17/2785; G06F 17/2755; G06F 17/274; G06F 17/271; G06F 17/277; H05K 999/99
USPC .... 704/9, 231, 235, 270, 275, 255, 256, 257
See application file for complete search history.

(56) References Cited

U.S. PATENT DOCUMENTS

| | | | |
|---|---|---|---|
| 7,865,364 | B2 | 1/2011 | Helbing |
| 7,873,523 | B2 | 1/2011 | Potter et al. |
| 7,890,329 | B2 | 2/2011 | Wu et al. |
| 8,204,751 | B1 | 6/2012 | Di Fabbrizio et al. |
| 8,577,671 | B1 * | 11/2013 | Barve ............... G06F 17/30522 370/352 |
| 2002/0133347 | A1 | 9/2002 | Schoneburg et al. |
| 2006/0143576 | A1 | 6/2006 | Gupta et al. |
| 2006/0155546 | A1 | 7/2006 | Gupta et al. |
| 2008/0162140 | A1 * | 7/2008 | Silva ..................... G10L 15/193 704/270.1 |
| 2010/0131274 | A1 | 5/2010 | Stent et al. |
| 2012/0016678 | A1 | 1/2012 | Gruber et al. |
| 2014/0257792 | A1 | 9/2014 | Grandrabur et al. |
| 2015/0149177 | A1 * | 5/2015 | Kalns .................. G10L 15/1822 704/257 |

OTHER PUBLICATIONS

Frampton et al., "Learning More Effective Dialogue Strategies Using Limited Dialogue Move Features", In Proceedings of the 21st International Conference on Computational Linguistics and 44th Annual Meeting of the ACL, published Jul. 2006, 8 pgs.

PCT International Search Report in PCT/US2016/029410, mailed Jul. 26, 2016, 10 pages.

PCT 2nd Written Opinion in International Application PCT/US2016/029410, mailed Apr. 6, 2017, 7 pages.

* cited by examiner

CONTEXT CARRYOVER IN LANGUAGE UNDERSTANDING SYSTEMS OR METHODS

BACKGROUND

Machine learning, language understanding, and artificial intelligence are changing the way users interact with the computers. Developers of computers and applications are always trying to improve the interactions between humans and computers. Language understanding applications (e.g., digital assistant applications) require at least some contextual language understanding for interpreting spoken language input and/or textual input.

It is with respect to these and other general considerations that embodiments disclosed herein have been made. Also, although relatively specific problems may be discussed, it should be understood that the embodiments should not be limited to solving the specific problems identified in the background or elsewhere in this disclosure.

SUMMARY

In summary, the disclosure generally relates to systems and methods for proper user intent or goal tracking for contextual language understanding by utilizing information from one or more previous user natural language inputs and one or more previous system generated responses to the user natural language inputs. More specifically, the systems and methods disclosed herein apply a common schema to the responses and natural language inputs and provide carryover tracking for any prior responses and natural language inputs. Accordingly, the systems and methods disclosed herein for contextual language understanding provide for a more accurate, a more reliable, and a more efficient context carryover and goal tracking system.

One aspect of the disclosure is directed to a system. The system includes at least one processor and a memory. The memory encodes computer executable instruction that, when executed by the at least one processor, cause the at least one processor to perform a method for contextual language understanding. The method for contextual language understanding includes receiving a first natural language input and identifying a first set of entities in the first natural language input utilizing a schema. The method further includes receiving a first response to the first natural language input based on the first set of entities and identifying a second set of entities in the first response utilizing the schema. The method also includes receiving a second natural language input and identifying a third set of entities in the second natural language input utilizing the schema. Additionally, the method includes identifying a first set of carryover entities from any previous set of entities for carryover based on the third set of entities. Further, the method includes determining a first user intent based on the third set of entities and the first set of carryover entities and generating a second response based on the first user intent.

Another aspect of the disclosure includes a system. The system comprises a prediction system, a tracking system, and an intent system. The prediction system identifies entities in received data utilizing a common schema. The data includes natural language inputs and responses. The tracking system determines that an entity from a previous turn should carry over to a current turn of a conversation based on the entities from the current turn to form carryover entities. The intent system determines a user intent based on the carryover entities and the entities from the current turn and generates a current response based on the user intent.

Yet another aspect of the disclosure includes a method for contextual language understanding. The method includes receiving a first natural language input from first data from a user device and determining a first prediction utilizing a schema based on the first natural language input. The method further includes receiving a first response based on the first prediction from second data from the user device and determining a second prediction utilizing the schema based on the first response. This method further includes receiving a second natural language input from third data from the user device and determining a third prediction utilizing the schema based on the second natural language input. The method also includes comparing the third prediction to any previous prediction to select carryover entities from at least the first and the second predictions and combining the third prediction and the carryover entities to produce a final prediction of the second natural language input. Additionally, the method includes generating a second response based on the final prediction of the second natural language input and sending the second response to the user device for performance of the second response.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1:
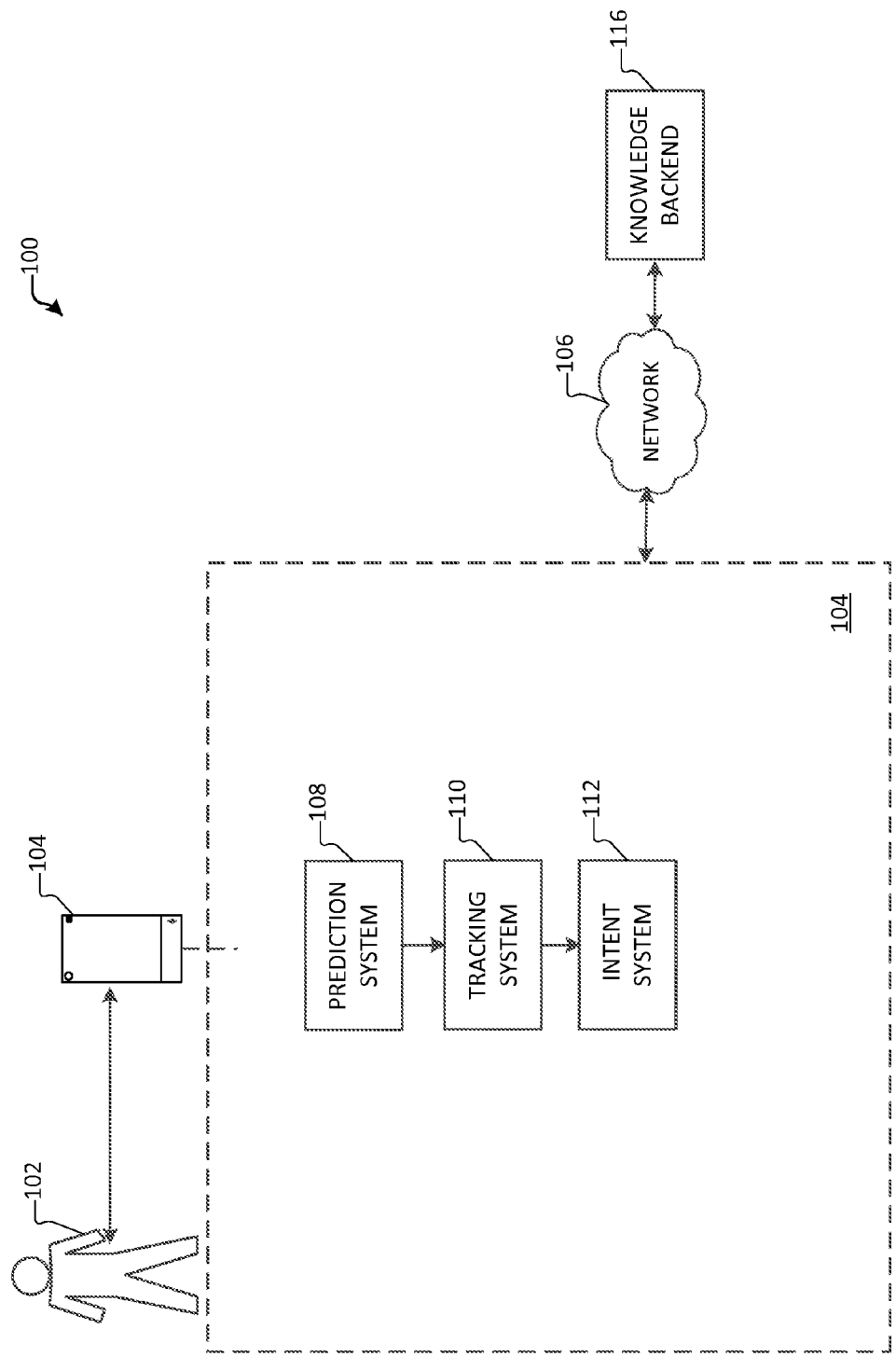
FIG. 1 illustrates an exemplary context carryover and goal tracking system implemented at a client computing device for contextual language understanding, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Progress in machine learning, language understanding and artificial intelligence are changing the way users interact with the computers. Digital assistant applications, such as Ski, Google Now and Cortana are examples of the shift in human computer interaction.

In order to track the user goal accurately in a multi-turn interaction it is essential to learn and model dependency and interactions between user turns and system responses in the session context. Current systems, such as Siri and Cortana, do not take this into account and model this dependency. A practical yet fragile solution that is deployed in these systems is to constrain the user in an on-rails experience/interaction to complete the task. Such an on-rails experience takes the flexibility and natural interaction away and in fact hurts the task completion when a user or one or more of the system components (e.g. speech recognition) do not behave as expected.

Accordingly, current language understanding systems modeled context carryover only using the user turns and ignoring the system response and knowledge results altogether. The knowledge results may change or update based on the day, month, or year, so resolving "he" and "after that" may be based on the current knowledge result. For example, these current systems, which only use user queries (or natural language inputs) for context carryover, do not address the following scenarios:

Scenario 1:
User Turn 1: When do I have meeting with Alan tomorrow?
User Turn 2: Do I have a meeting after that?

Scenario 2:
User Turn 1: Who is the president of USA?
User Turn 2: Who is he married to?

As discussed above, the current language understanding systems attempt to determine a user goal or intent based merely on the natural language inputs (or user queries), whether in spoken language or text, from the user. However, none of these current systems utilize data from the responses generated by these current systems to reply to the received natural language inputs to help determine the user goal or intent. The systems and methods disclosed herein are able to determine a user intent or goal for contextual language understanding by utilizing information from one or more previous user natural language inputs and one or more previous system generated responses to the user natural language inputs. More specifically, the systems and methods disclosed herein apply a common schema to the responses and natural language inputs and provide carryover tracking for any prior responses and/or natural language inputs. Accordingly, the systems and methods disclosed herein for contextual language understanding provide for a more accurate, a more reliable, and a more efficient context carryover and goal tracking system for contextual language understanding.

Figure 2:
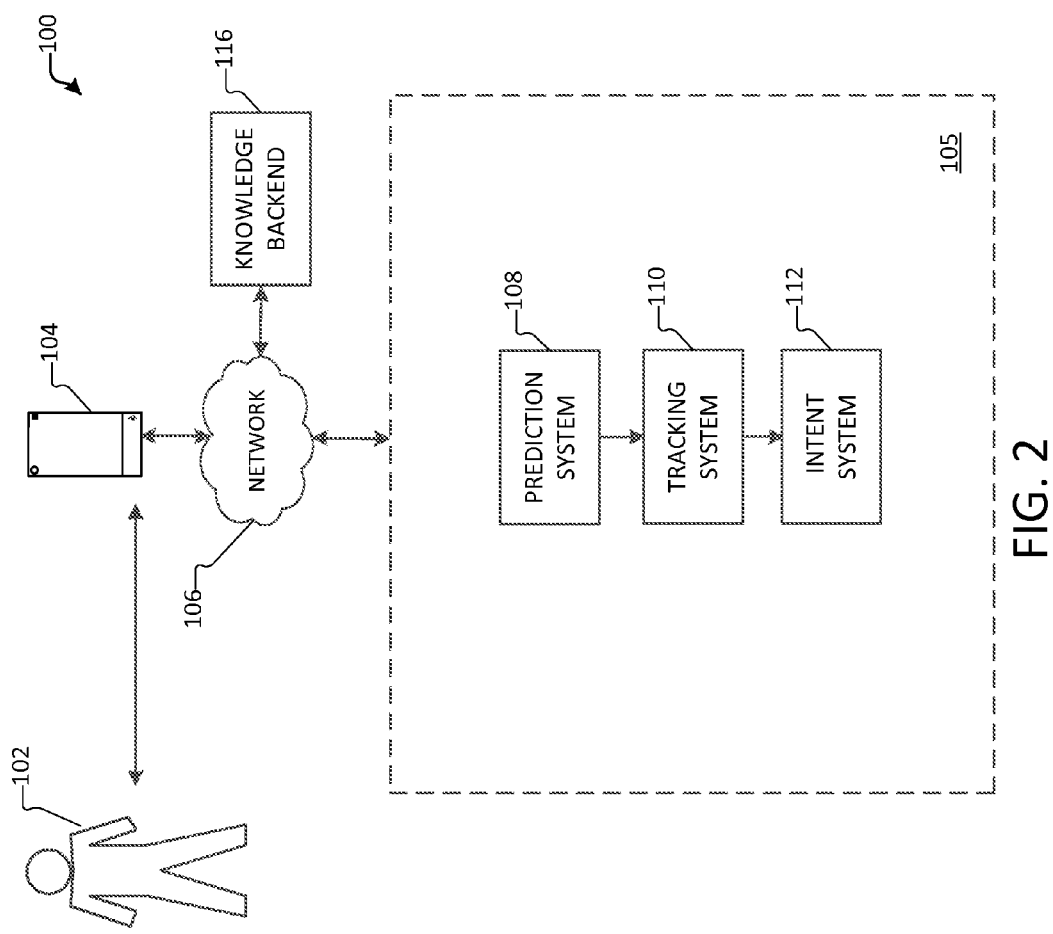
FIG. 2 illustrates an exemplary context carryover and goal tracking system implemented at a server computing device for contextual language understanding, according to an example embodiment.

FIGS. 1 and 2 generally illustrate an example of a context carryover and goal tracking system 100 for contextual language understanding. The system 100 utilizes machine learning techniques for contextual language understanding. In some embodiments, the system 100 is implemented on a client computing device 104, as illustrated in FIG. 1. In a basic configuration, the client computing device 104 is a computer having both input elements and output elements. The client computing device 104 may be any suitable computing device for implementing the system 100 for contextual language understanding. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device for implementing the context carryover and goal tracking system 100 for contextual language understanding may be utilized.

In other embodiments, the context carryover and goal tracking system 100 is implemented on a server computing device 105, as illustrated in FIG. 2. The server computing device 105 may provide data to and or receive data from the client computing device 104 through a network 106. In some embodiments, the network 106 is a distributed computing network, such as the internet. In further embodiments, that system 100 is implemented on more than one server computing device 105, such as a plurality of server computing devices 105. In some embodiments, the system 100 is a hybrid system that includes the client computing device 104 as illustrated in FIG. 1 in conjunction with the server computing device 105 as illustrated in FIG. 2.

The system 100 includes one or more of a prediction system 108, a tracking system 110 and/or an intent/goal system 112. In some embodiments, the system 100 communicates with a knowledge backend 116. In other embodiments, the system 100 includes the knowledge backend 116 through a network 106. The knowledge backend 116 may be updated based on the day, week, month, and/or year. The various components may be implemented using hardware, software, or a combination of hardware and software. The system 100 is configured to process natural language inputs and responses presented to the user 102 whether generated by the system 100 or not. In this regard, the system 100 facilitates contextual language understanding in multi-turn scenarios utilizing information from the responses in addition to the natural language inputs.

In one example, a natural language input includes phrases, words, and/or terms in the form of a spoken language input (e.g., a user query and/or request) that is entered by the user 102 into the device 104. In these embodiments, a microphone in the device 104 may record the spoken language input as data. In another example, a natural language input includes phrases, words, and/or terms in the form of a textual language input (e.g., a user query and/or request) that is entered by the user 102 into the device 104. In these embodiments, the device may receive the textual language via a key pad, touch screen, or any other suitable data entry system on the device 104.

In some embodiments, a multi-turn scenario is a scenario where more than one natural language input is processed during a session between a user 102 and the system 100. In some cases, each natural language input may be interpreted as a turn during a session. In other cases, a turn may include both the natural language input and a response/action by the system 100. That is, a first turn of a conversation may include both a natural language input and a response/action by the system 100. In some embodiments, a multi-turn scenario indicates that information from each turn of the session (or conversation) is utilized to make a prediction. In some embodiments, a session includes a conversation between a user 102 and an application (e.g., a digital assistant application) of the context carryover and goal tracking system 100. In these embodiments, the session may start when the application is activated and a user starts speaking or enters text and end when the application is de-activated.

The system 100 includes a prediction system 108. The prediction system 108 associates or predicts different features or attributes of the features (attributes may also be referred to as slots herein) that may be relevant to the words, terms and/or phrases in the natural language input and responses. The prediction system 108 receives the responses and/or the natural language inputs. In some embodiments, the prediction system 108 receives the responses and/or the natural language inputs as data from another component within system 100 or as data from separate device. In some embodiments, the In other words, the prediction system 108 identifies entities in received data utilizing a common schema, wherein the data include natural language inputs and responses. As such, the prediction system 108 associates or predicts different features or attributes of the features that may be relevant to the words, terms and/or phrases in the responses generated by the client computing device 104 or server computing device 105 and is not limited to the natural language input. In some embodiments, the prediction system 108 has to convert the responses into words, terms, and/or phrases. The prediction system 108 utilizes the same schema for identifying or determining features/attributes relevant to the words, terms and/or phrases in the natural language input and responses. The use of the common schema by the prediction system 108 provides consistency for associating features or attributes of the features with words, terms and/or phrases across the natural language inputs and the responses. Further, the prediction system 108 calculates scores indicative of the probability that each identified feature or attribute is in fact correct. Each determined or predicted features or attributes of the features and its score form an entity. All of the entities for a given response or a given natural language input form a set of entities or prediction. Accordingly, each entity is related to a word, a term or a phrase from within the natural language inputs and the responses. Further, each entity may be a feature, a slot, intent, and/or domain of the word, term or phrase from within the natural language inputs and the responses.

There are advantages in having the features or attributes of the features assigned/identified by the system 100 for generated responses follow the same schema as applied to the natural language inputs. Having a different schema for each response or input could be handled by system 100, but could potentially lead to unnecessary procedural complexity. The schema will need to be exposed to the prediction system 108 and to the tracking system 110 and, potentially, to the client. The key types of the schema have to be distinguishable from natural language inputs so that a signal which distinguishes when a given value is related to a user natural language input or a system generated response can be discernable.

In some embodiments, the features or attributes include slot predictions, domain predictions, and/or intent predictions. For example, in the natural language input, "lessons from 2 pm to 4 pm," the prediction system 108 may make a slot prediction and identify a "start_time" with "2 pm" and may identify an "end_time" with "4 pm." Further, in this example, the prediction system 108 may make a domain prediction that this natural language input is in the calendar domain with a score of 0.4. Additionally, in this example, the prediction system 108 may make an intent prediction that the user's intent is to add this item to his or her calendar with a score of 0.3.

In some embodiments, the entities are determined by the prediction system 108 utilizing conditional random fields and/or support vector machines. However, any suitable machine learning system or method for predicting relevant features or attributes of the features of words, terms and/or phrases in the natural language input and/or responses may be utilized by prediction system 108. In some embodiments, the prediction system 108 communicates with a knowledge backend 116 to determine entities for the natural language inputs and/or the responses.

The set of entities for a response or for a natural language input are sent from the prediction system 108 to the tracking system 110. In other words, the tracking system 100 determines that an entity from a previous turn should carry over to a current turn of a conversation based on the entities from the current turn to form carryover entities. The tracking system 110 identifies if an entity identified in a previous natural language input and/or a previous response is still relevant to a newly received current set of entities. In some embodiments, the tracking system 110 compares each entity from a previous response or a previous natural language input to the set of entities for the current set of entities. If the tracking system 110 determines that a previous entity is relevant to the current set of entities, the tracking system 110 classifies the previous entity as "keep." If the tracking system 110 determines that a previous entity is not relevant to the current set of entities, the tracking system 110 classifies the previous entity as "drop." After the tracking device has reviewed and classified each of the previous entities as "keep" or "drop," the tracking system 110 compiles the entities classified as "keep" into a set of carryover entities. The set of carryover entities are sent from the tracking system 110 to the intent system 112. In some embodiments, no entities are identified or classified as "keep." In these embodiments, the set of carryover entities may include zero entities.

In some embodiments, while the tracking system 110 receives sets of entities for each response, the tracking system 110 does not classify or identify the carryover entities until a natural language input is received or until the beginning of each new turn. In alternative embodiments, the tracking system 110 classifies or identifies the carryover entities after the receipt of any new set of entities whether they came from the current response or the current natural language input. The term "current" as used herein refers to the most recently received data. For example, the current response is the last response or most recent response generated by a device 104 or 105 and provided to the user. For example, the current natural language input is the last or the most recent natural language input received from the user.

In some embodiments, the system 100 reviews any previous set of entities or entities from any past turn, including responses, in a session to determine what entities should be classified into the set of carryover entities. In other embodiments, the system 100 reviews entities from the last turn (entities from the current response and last natural language input) and the last set of carryover entities from the last turn of one session to determine what entities should be classified into the set of carryover entities. The term "last turn" as used herein refers to the natural language input received prior to the current natural language input and to the response that was generated in reply to the natural language input received prior to the current natural language. The term "any previous set of entities" as used herein refers to any entities identified for a natural language input and identified for a response received prior to the current set of entitles for a given session. The "last set of carryover entities" as used herein refers to the set of carryover entities that were utilized to generate the current response or the response from the last turn.

In some embodiments, the tracking system 110 utilizes conditional random fields and/or support vector machines to classify the entities. However, any suitable machine learning system or method for classifying the entities or for identifying a set of carryover entities may be utilized by tracking system 110. In some embodiments, the tracking system 110 communicates with a knowledge backend 116 to determine how to classify given entities or identify the set of carryover entities.

The tracking system 110 sends the set of carryover entities to the intent system 112. The intent system 112 receives the set of carryover entities from the tracking system 110. Further, the intent system 112 receives the set of entities from the current natural language input from the tracking system 110 and/or the prediction system 108. In some embodiments, the intent system 112 combines the current set of entities (or a first prediction) with the set of carryover entities (or a second prediction). The intent system 112 analyzes the combination of the current set of entities and the set of carryover entities, including their given probability scores, and determines the most likely user intent or goal based on this data. In other words, the intent system 112 makes a final prediction of the user intent/goal based on the combined entities. Once the intent system 112 has determined or predicted the user intent or goal, the intent system 112 generates a response to the current natural language input. In some embodiments, the response generated by the intent system 112 is automatically performed by the client computing device 104. In other embodiments, the generated response from the intent system 112 is sent from a server computing device 105 to the client computing device 104 as instructions for performance by the client computing device 104. In other words, the intent system 112 determines a user intent based on the carryover entities and the entities from the current turn and generates a current response based on the user intent.

In some embodiments, the intent system 112 utilizes conditional random fields and/or support vector machines to determine the user goal or intent and/or to generate the response. However, any suitable machine learning system or method for determining the user intent and/or for generating the response may be utilized by intent system 112. In some embodiments, the intent system 112 communicates with a knowledge backend 116 to determine the user goal and/or to generate the response.

The response is any action performed by the device 104 in order to reply to or answer the natural language input. The response may include an answer to the natural language input based on the final prediction of the ultimate goal of the user 102. For example, if the natural language input includes a request for driving directions, the action/answer may include providing driving directions to the user 102 based on the final prediction. In some embodiments, if there is an interaction between system 100 that need to be clarified, the system 100 can merely generate a query in its response. For example, the response may include a question to the user 102. For example, if the natural language query includes a request to create a meeting, the response may be "for what time." In another example, if the session is as listed below:

"Show me my next meetings with Ruhi"
  Wednesday, Apr. 21, 2015 at 2 pm
  "Do I have a meeting with Puyang on the same day as the first one,"
the response may include a question "do you mean the Wednesday meeting with Ruhi?". In other cases, the action/response may include performing a task. For example, the action may include creating a calendar event, sending a text message, setting a reminder, performing a query using a search engine (e.g., Bing, Google, Yahoo), and the like. As such, in some embodiments, the prediction system 108 has to convert the response into phrases, words, and/or terms.

In some embodiments, the same device 104,105 that generates the response or includes the intent system 112 performs the feature or attribute predictions or includes the prediction system 108. In these embodiments, the device 104, 105 sends the generated response from its intent system 112 to its prediction system 108 automatically upon generation. However, in a hybrid system, where both the client computing device 104 and the server computing device 105 are capable of generating responses, any response generated by one device must be sent from that device to the other device for accurate prediction. For example, if the client computing device 104 generates a response based on a natural language input from the user without connecting to the network 106, the client computing device 104 must send not only the natural language input but also the client generated response to the server computing device 105, so that the server computing device 105 can accurately track the turns of the session.

Unlike previously utilized systems, the context carryover and goal tracking system 100 includes the response in determining the final prediction of the user goal/intent. For example, the prediction system 108 determines a set of entities for each response provided to the user 102. The prediction system 108 determines a set of entities utilizing the same schema that the prediction system 108 utilized for the natural language inputs to provide consistent entity creation. Further, the tracking system 110 compares the set of entities from one or more responses to the set of entities from the current natural language input to determine if any of these entities should be included in the set of carryover entities. As such, the intent system 112 analyzes entities from one or more past response to determine the current user goal/intent. The use of this additional data creates a context carryover and goal tracking system 100 for contextual language understanding that is more accurate, more reliable, and more efficient than previously utilized systems that did not consider the system generated responses provided to the user 102.

Accordingly, System 100 is able to determine whether the user is implicitly referring to an attribute or features of the response or the natural language input for the current turn. Provided below is an example session sequence:
  "When is my next meeting with Ruhi"
    At 2 pm on Wednesday, Apr. 21, 2015
  "Do I have a meeting with Puyang on the same day"
In this sequence, the date-time information in the result in the $1^{st}$ turn is utilized by system 100 to build the right knowledge query in the $2^{nd}$ turn. Additionally, system 100 is able to respond to natural language inputs (or user queries) that refer explicitly to more granular attributes of a presented response and not to the response as a whole.

Figure 3:
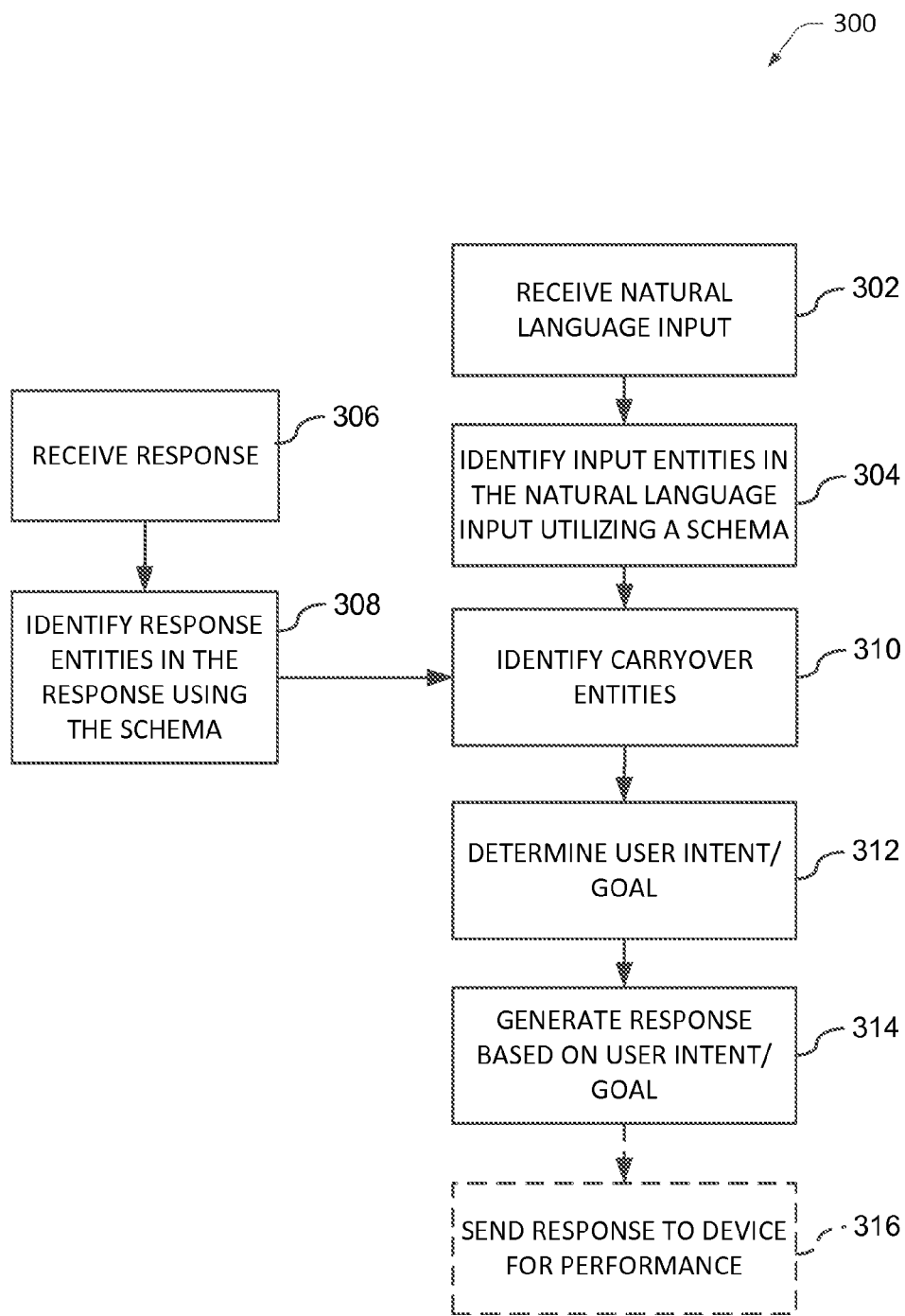
FIG. 3 is a flow diagram illustrating an example of a method for contextual language understanding, according to an example embodiment.

FIG. 3 illustrates a flow diagram conceptually illustrating an example of a method 300 for contextual language understanding. Method 300 may be repeatedly performed for each turn (including the response) of a conversation/session. In some embodiments, method 300 is performed by the context carryover and goal tracking system 100 as described above. Method 300 utilizes the responses provided to the user in addition to the natural language inputs for a given session in order to predict the user intent/goal. As such, method 300 provides for more accurate, more reliable, and more efficient contextual language understanding in comparison to methods that do not utilize the responses provided to the user to determine a user goal/intent.

At operation 302, a natural language input is received. A natural language input is received at operation 302 at each turn of the session or in response to each natural language input received by a client device. A natural language input may include phrases, words, and/or terms in the form of a spoken and/or textual language input (e.g., a user query and/or request). In some embodiments, at operation 302 the natural language input is a spoken language input that is entered by the user into a device. In these embodiments, a microphone in a device may record the spoken language input as data. In another example, a natural language input includes phrases, words, and/or terms in the form of a textual language input by the user into the device. In these embodiments, the device may receive the textual language via a key pad, touch screen, or any suitable type of input system on the device. In some embodiments, the natural language input is received directly from the user. In other embodiments, the natural language input is received from a client device.

At operation 304 a set of entities in the natural language input are identified utilizing a schema. Features or attributes of the features are associated or predicted that may be relevant to the words, terms and/or phrases in the natural language input at operation 304. Additionally, a score indicative of the probability that each of the predicted features is in fact correct is calculated at operation 304. Each determined or predicted feature and its score form an entity. All of the entities for a given natural language input form a set of entities or set of input entities (or a prediction). In some embodiments, the features are predicted by communicating with a knowledge backend at operation 304. In some embodiments, conditional random fields and/or support vector machines are utilized at operation 304 to determine a set of entities. However, any suitable machine learning system or method for predicting relevant features of words, terms and/or phrases in the natural language input and/or responses may be utilized at operation 304. In some embodiments, operation 304 is performed by a prediction system.

At operation 306 a response to the natural language input based on the set of entities is received. A response is received at operation 306 at each turn of the session or in reply to each natural language input received by a client device. In some embodiments, at operation 306 the response is any action performed by the device in order to reply to or answer the natural language input. The response may include an answer to the natural language input based on the final prediction of the ultimate goal of the user. For example, the action may include creating a calendar event, sending a text message, setting a reminder, performing a query using a search engine (e.g., Bing, Google, Yahoo), and the like. As such, in some embodiments, the response has to be converted into phrases, words, and/or terms, which is performed at operation 308. In some embodiments, the response is received automatically upon generation. In other embodiments, the response is generated by another device and received from that other device.

At operation 308 a set of entities in the response are identified utilizing the schema. In some embodiments, as discussed above, the response has to be converted into phrases, words, and/or terms at operation 308. Further, the same schema for identifying or determining features or attributes of the features relevant to the words, terms and/or phrases is utilized in both the natural language input and responses. The use of the common schema provides feature/attribute consistency across the natural language inputs and the responses. Additionally, a score indicative of the probability that each of the predicted features/attributes for the response is in fact correct is calculated at operation 308. Each determined or predicted feature or attribute of the features and its score form an entity. All of the entities for a given response form a set of entities. As such, a set of response entities are determine or identified for the response at operation 308. As such, method 300 identifies both the input entitles and the response entities and is not limited to the input entities of the natural language input. In some embodiments, the features/attributes are predicted and the scores are calculated by communicating with a knowledge backend at operation 308. In some embodiments, conditional random fields and/or support vector machines are utilized at operation 308 to determine a set of response entities. However, any suitable machine learning system or method for predicting relevant features or attributes of the features of words, terms and/or phrases in the responses may be utilized at operation 308.

A set of carryover entities are identified from past entities for carryover based on the current set of entities at operation 310. In other words, the past entities are identified as relevant or not relevant when compared to the current set of entities at operation 310. The term "past entities" as utilized herein refers to any entity identified or determined prior to the In some embodiments, the past entities refer to any entity previously predicted at operation 304 or 308 during any prior turn of a session that is not part of the current set of entities. In other embodiments, the past entities include entities from the last turn (entities from the current response and the last natural language input) and the last set of carryover entities from the last turn of the session. If a past entity is determined to be relevant to the current set of entities, the past entity is classified as "keep" at operation 310. If a past entity is determined to be not relevant to the current set of entities, the past entity is classified as "drop" at operation 310. After each of the past entities has been classified as "keep" or "drop", the past entities classified as "keep" are compiled into a set of carryover entities. In some embodiments, no entities are identified or classified as "keep." In these embodiments, the set of carryover entities may include zero entities.

In some embodiments, the past entities are not classified or identified as carryover entities until a natural language input is received or until the beginning of each new turn at operation 310. In alternative embodiments, the past entities are classified or identified as carryover entities after the receipt of any new set of entities whether they came from the current response or the current natural language input at operation 310.

In some embodiments, conditional random fields and/or support vector machines are utilized to classify the past entities at operation 310. However, any suitable machine learning system or method for classifying the past entities or for identifying a set of carryover entities may be utilized at operation 310. In some embodiments, the past entities are classified or the carryover entities are identified by utilizing a knowledge backend at operation 310. In some embodiments, operation 310 is performed by a tracking system.

A user intent/goal is determined based on the current set of entities and the carryover entities at operation 312. The current set of entities and the carryover entities (features/attributes and scores) are analyzed to determines the most likely user intent or goal based on this data at operation 312. In other words, a final prediction of the user intent/goal is made based on the combined set of carryover entities and current entities at operation 312. In some embodiments, conditional random fields and/or support vector machines are utilized to predict the user goal or intent at operation 312. However, any suitable machine learning system or method for determining the user intent may be utilized at operation 312. In some embodiments, the user goal is predicted by utilizing a knowledge backend at operation 312. In some embodiments, operation 312 is performed by an intent system.

At operation 314 a response is generated based on the predicted user intent for the current natural language input. In some embodiments, conditional random fields and/or support vector machines are utilized to determine or to generate the response at operation 314. However, any suitable machine learning system or method for generating the response may be utilized at operation 310. In some embodiments, the response is generated by utilizing knowledge backend at operation 310. In some embodiments, operation 314 is performed by an intent system.

In some embodiments, method 300 includes operation 316. At operation 316 the response is sent to the client device for performance. In these embodiments, a device separate from the client device performing operation 314 generates the response. As such, this separate device, such as a server computing device, has to send the determined response to the client device to be performed by the client device. In alternative embodiments, the response is automatically performed by the client device upon generation. In these embodiments, the client device is performing operation 314.

Figure 4:
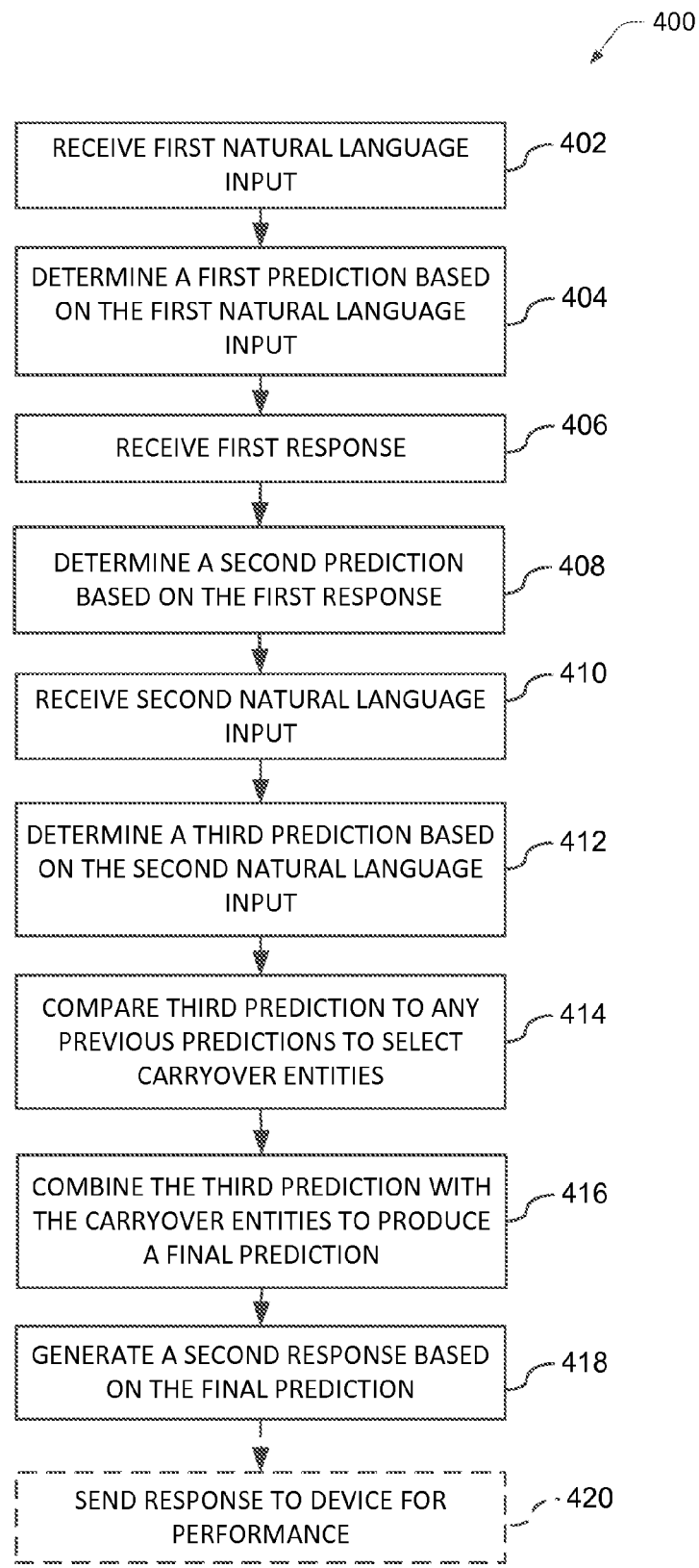
FIG. 4 is a flow diagram illustrating an example of a method for contextual language understanding, according to an example embodiment.

FIG. 4 illustrates a flow diagram conceptually illustrating an example of a method 400 for contextual language understanding. In some embodiments, method 400 is performed by the context carryover and goal tracking system 100 as described above. Method 400 utilizes the responses provided to the user in addition to the natural language inputs for a given session in order to predict the user intent/goal. As such, method 400 provides for more accurate, more reliable, and more efficient contextual language understanding in comparison to methods that do not utilize the responses provided to the user to determine a user goal/intent.

At operation 402, a first natural language input is received. In some embodiments, the natural language input is received from first data from a user device. In further embodiments, at operation 402 the natural language input is a spoken language input that is entered by the user into a device. In these embodiments, a microphone in a device may record the spoken language input as data. In another example, a natural language input includes phrases, words, and/or terms in the form of a textual language input by the user into the device at operation 402. In these embodiments, the device may receive the textual language via a key pad, touch screen, or any other suitable type of input system on the device. In some embodiments, the natural language input is received directly from the user. In other embodiments, the natural language input is received from a client device.

A first prediction utilizing a schema based on the first natural language input is determined at operation 404. Features or attributes of the features are predicted utilizing a schema that may be relevant to the words, terms and/or phrases in the natural language input at operation 404. Additionally, a score indicative of the probability that each of the predicted features or attributes is in fact correct is calculated at operation 404. Each determined or predicted feature or attribute of a feature and its score form an entity. All of the entities for a given natural language input form a set of entities or a first prediction. In some embodiments, the first prediction is determined by communicating with a knowledge backend at operation 404. In some embodiments, conditional random fields and/or support vector machines are utilized at operation 404 to determine the first prediction. However, any suitable machine learning system or method for making a first prediction may be utilized at operation 404. In some embodiments, operation 404 is performed by a prediction system.

At operation 406 a first response is received based on the first prediction. In some embodiments, the first response is received from second data from the user device. In some embodiments, at operation 406 the response is any action performed by the device in order to reply to or answer a natural language input. The response may include an answer to the natural language input based on the final prediction of the ultimate goal of the user. For example, the action may include creating a calendar event, sending a text message, setting a reminder, performing a query using a search engine (e.g., Bing, Google, Yahoo), and the like. As such, in some embodiments, the response has to be converted into phrases, words, and/or terms, which is performed at operation 408. In some embodiments, the response is received automatically upon generation by the system or device performing method 400 because the system or device performing method 400 also generated the response. In other embodiments, the response is generated by another device that is not performing method 400. In these embodiments, the response is received from this other device that is not performing method 400.

A second prediction utilizing the schema was determined based on the first response at operation 408. In some embodiments, as discussed above, the response has to be converted into phrases, words, and/or terms at operation 408. Further, the same schema for first prediction is utilized to determine the second prediction. The use of the common schema provides feature or attribute consistency across the natural language inputs and the responses. Additionally, a score indicative of the probability that each of the predicted features or attributes is in fact correct for the first response is calculated at operation 408. Each determined or predicted feature/attribute and its score form a response entity. All of the entities for a given response form a set of entities or a second prediction. As such, method 400 identifies both the input entities and response entities and is not limited to the input entities of the natural language input. In some embodiments, the second prediction is determined by communicating with a knowledge backend at operation 408. In some embodiments, conditional random fields and/or support vector machines are utilized at operation 408 to determine the second prediction. However, any suitable machine learning system or method for determining a second prediction may be utilized at operation 408. In some embodiments, operation 408 is performed by a prediction system.

A second natural language input is received at operation 410. In some embodiments, the second natural language input is received from third data from the user device at operation 410. Operation 410 is the same as or similar to operation 402 except that operation 410 processes the second natural language input received during a session or conversation indicating the beginning of a second turn instead of the first natural language input.

At operation 412 a third prediction utilizing the schema based on the second natural language input is determined. The same schema for first prediction and the second prediction is utilized to determine the third prediction. The use of the common schema provides feature or attribute of the feature consistency across the natural language inputs and the responses during method 400. Operation 412 is the same as or similar to operation 404 except that operation 412 makes a prediction based the second natural language input received during a session or conversation indicating the beginning of a second turn instead of the first natural language input. For example, features or attributes of the features are predicted utilizing a schema that may be relevant to the words, terms and/or phrases in the second natural language input at operation 412. Additionally, a score indicative of the probability that each of the predicted features or attributes is in fact correct for the second natural language input is calculated at operation 412. Each determined or predicted feature or attribute of a features and its score form an entity. All of the entities for the second natural language input form a set of entities or a third prediction. In some embodiments, the third prediction is determined by communicating with a knowledge backend at operation 412. In some embodiments, conditional random fields and/or support vector machines are utilized at operation 412 to determine the third prediction. However, any suitable machine learning system or method for making a third prediction may be utilized at operation 412. In some embodiments, operation 412 is performed by a prediction system.

The third prediction is compared to any previous predictions to select carryover entities at operation 414. In other words, the entities identified from any previous turn are compared to the entities of the current turn during operation 414. In this embodiment, the previous predictions include from at least the first and the second predictions. Based on this comparison, entities from the first and second predictions are identified as relevant or not relevant to the current set of entities at operation 414. In alternative embodiments, entities from additional past predictions are compared to the entities of the current prediction for relevance at operation 414. In other embodiments, only the last set of carryover entities and the entities from the last turn are compared to the entities of the current prediction for relevance at operation 414. If a past entity is determined to be relevant to the current prediction (such as the third prediction), the past entity is classified as "keep" at operation 414. If a past entity is determined to be not relevant to the current prediction (such as the third prediction), the past entity is classified as "drop" at operation 414. After each of the past entities has been classified as "keep" or "drop", the past entities classified as "keep" are compiled into a set of carryover entities. In some embodiments, no entities are identified or classified as "keep." In these embodiments, the set of carryover entities may include zero entities.

While in method 400, operation 414 is performed after the receiving a second natural language input in a session, in some embodiments, the past entities are classified or identified as carryover entities after any a natural language input is received or at the beginning of each new turn at operation 414. In alternative embodiments, the past entities are classified or identified as carryover entities after the receipt of any new set of entities whether they came from the current response or the current natural language input at operation 414.

In some embodiments, conditional random fields and/or support vector machines are utilized to select the carryover entities at operation 414. However, any suitable machine learning system or method for selecting or identifying carryover entities may be utilized at operation 414. In some embodiments, the carryover entities are selected or identified by utilizing a knowledge backend at operation 414. In some embodiments, operation 414 is performed by a tracking system.

At operation 416 the third prediction and the carryover entities are combined to produce a final prediction of the second natural language input. The final prediction is a prediction of the ultimate user goal that will be utilized by method 400 at operation 418 to determine an appropriate response to generate. The final prediction is only produced in response to a natural language input and is not determined in reaction to a response. The entities of the third prediction are combined with the carryover entities at operation 416. In other embodiments, where there have not been any prior predictions, the final prediction is based merely on the entities of the current prediction at operation 416. The current set of entities and the carryover entities if present (features/attributes and scores) are analyzed to produce the final prediction of the user intent or goal at operation 416. In some embodiments, conditional random fields and/or support vector machines are utilized to make the final prediction at operation 416. However, any suitable machine learning system or method for determining final prediction of user intent may be utilized at operation 416. In some embodiments, the final prediction is produced by utilizing a knowledge backend at operation 416. In some embodiments, operation 416 is performed by an intent system.

At operation 418 a second response is generated based on the based on the final prediction of the current natural language input (such as the second natural language input). In some embodiments, conditional random fields and/or support vector machines are utilized to determine or to generate the second response at operation 418. However, any suitable machine learning system or method for generating the second response may be utilized at operation 418. In some embodiments, the second response is generated by utilizing a knowledge backend at operation 418. In some embodiments, operation 418 is performed by an intent system.

In some embodiments, the first response discussed above is generated by method 400 at an operation similar to operation 418. In this embodiment, the first response is generated based on the first prediction of the first natural language input.

In some embodiments, method 400 includes operation 420. At operation 420 the response is sent to the client device for performance. In these embodiments, a device separate from the client device performing operation 418 generates the response. As such, this separate device, such as a server computing device, has to send the determined response to the client device to be performed by the client device. In alternative embodiments, the response is automatically performed by the client device upon generations. In these embodiments, the client device is performing operation 418.

FIGS. 5-8 and the associated descriptions provide a discussion of a variety of operating environments in which embodiments of the disclosure may be practiced. However, the devices and systems illustrated and discussed with respect to FIGS. 5-8 are for purposes of example and illustration and are not limiting of a vast number of computing device configurations that may be utilized for practicing embodiments of the disclosure, described herein.

Figure 5:
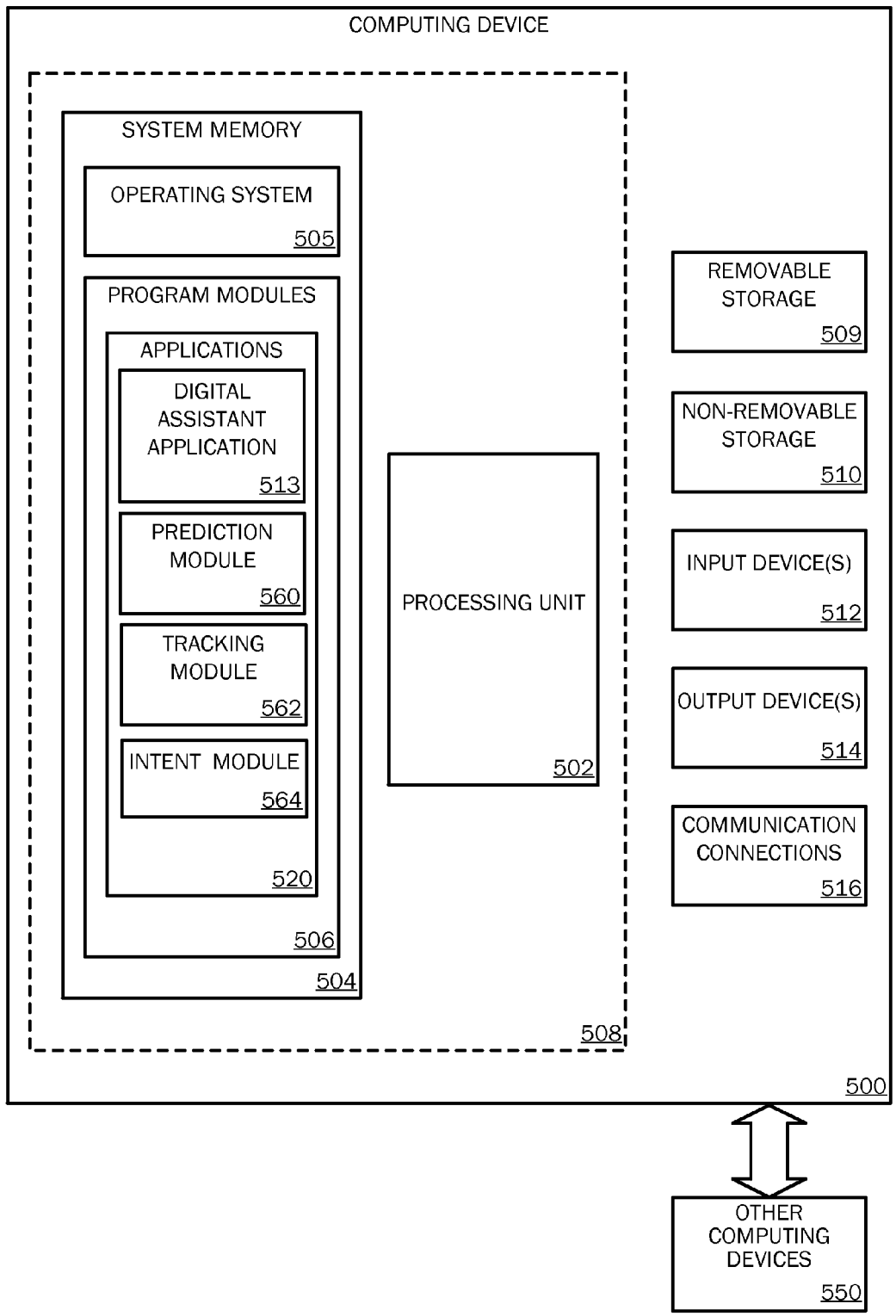
FIG. 5 is a block diagram illustrating example physical components of a computing device with which embodiments of the disclosure may be practiced.

FIG. 5 is a block diagram illustrating physical components (e.g., hardware) of a computing device 500 with which embodiments of the disclosure may be practiced. For example, a prediction module 560, a tracking module 562, and/or an intent module 564 could be implemented by the computing device 500. In some embodiments, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for a prediction module 560, a tracking module 562, and/or an intent module 564 that can be executed to employ the method 300 or 400 and implement portions of the system 100 disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510. For example, partially labeled data obtained by the prediction module 560, the tracking module 562, and/or the intent module 564 could be stored on any of the illustrated storage devices.

As stated above, a number of program modules and data files may be stored in the system memory 504. While executing on the processing unit 502, the program modules 506 (e.g., a prediction module 560, a tracking module 562, an intent module 564, and/or digital assistant application 513) may perform processes including, but not limited to, performing method 300 and/or method 400 as described herein. For example, the processing unit 502 may implement a prediction module 560, a tracking module 562, and/or an intent module 564. Other program modules that may be used in accordance with embodiments of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a calendaring application, etc. In some embodiment, the prediction module 560, the tracking module 562, and/or the intent module 564 is performed by one of the above referenced applications.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
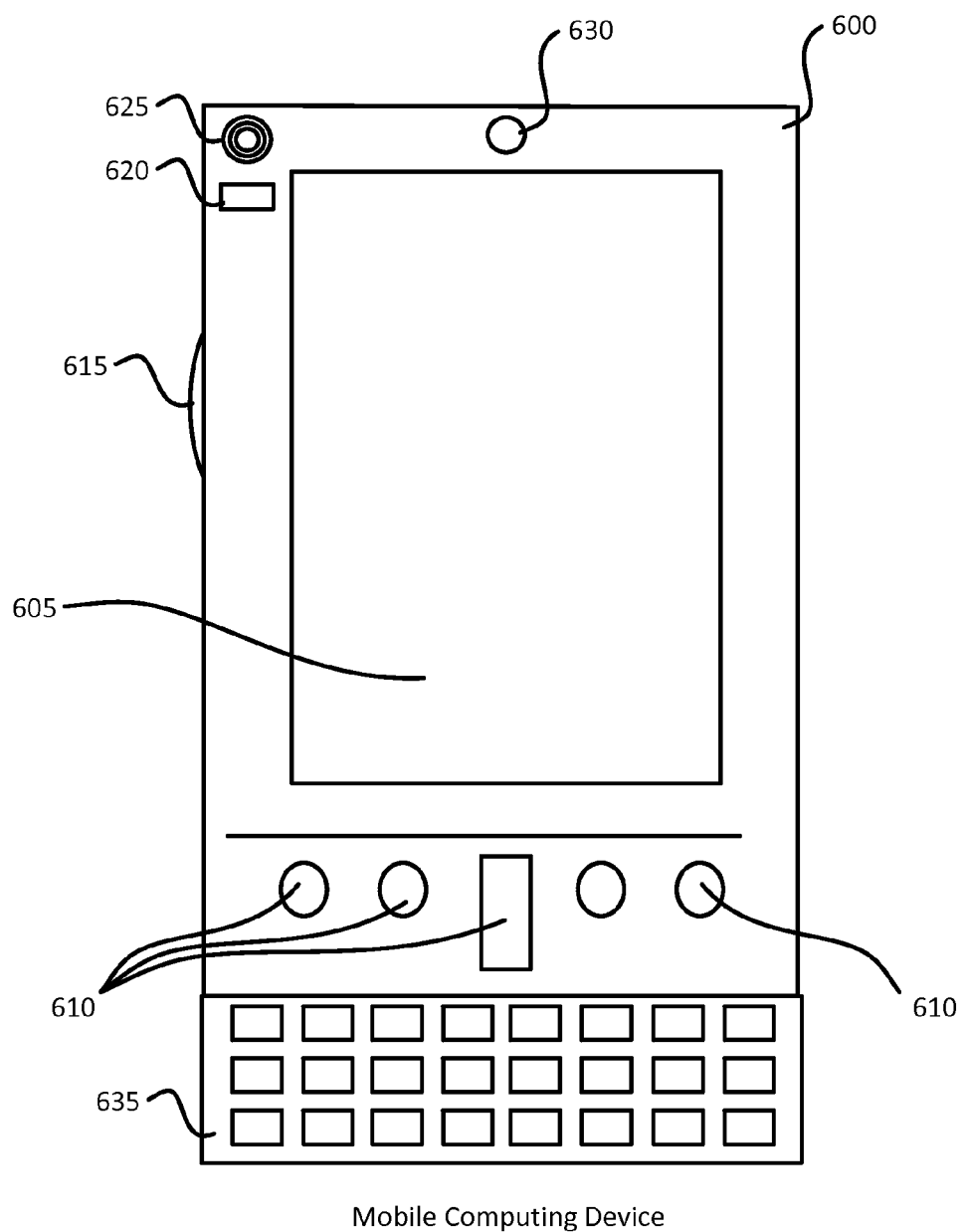
FIGS. 6A and 6B are simplified block diagrams of a mobile computing device with which embodiments of the present disclosure may be practiced.
Figure 6B:
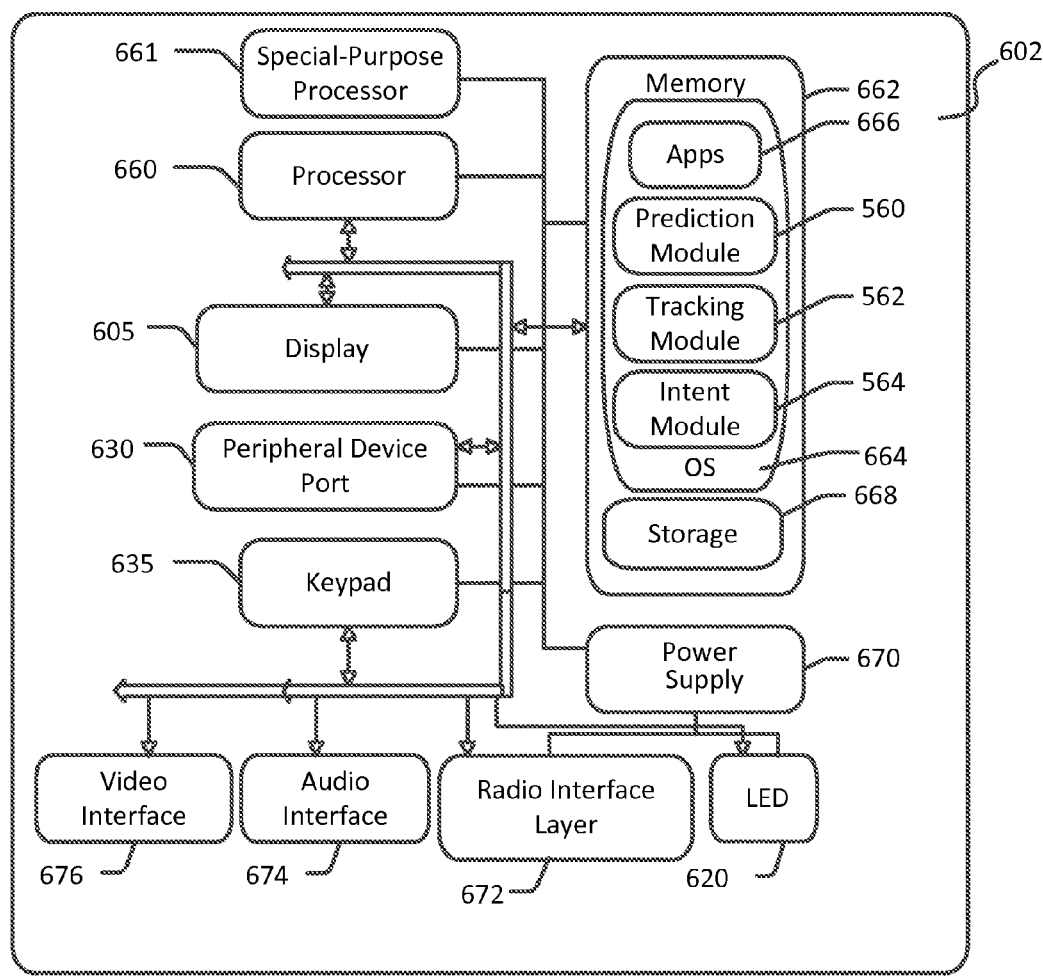

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which embodiments of the disclosure may be practiced. With reference to FIG. 6A, one embodiment of a mobile computing device 600 suitable for implementing the embodiments is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various embodiments, the output elements include the display 605 for showing a graphical user interface (GUI). In embodiments disclosed herein, the various user information collections could be displayed on the display 605. Further output elements may include a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (e.g., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 666 and/or a prediction module 560, a tracking module 562, and/or an intent module 564 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
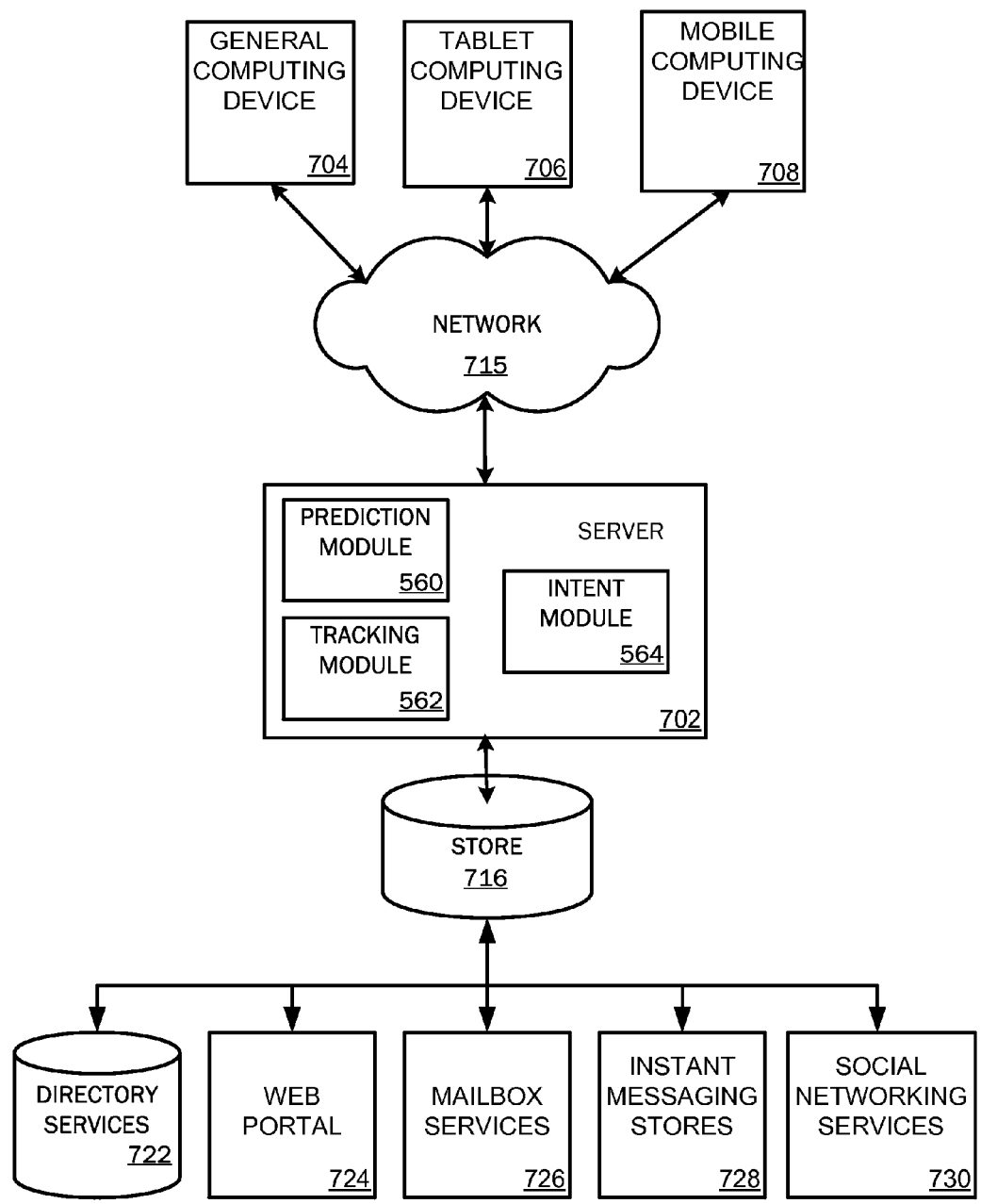
FIG. 7 is a simplified block diagram of a distributed computing system in which embodiments of the present disclosure may be practiced.

FIG. 7 illustrates one embodiment of the architecture of a system for processing data received at a computing system from a remote source, such as a general computing device 704, tablet 706, or mobile device 708, as described above. Content displayed at server device 702 may be stored in different communication channels or other storage types. For example, various documents may be stored using a directory service 722, a web portal 724, a mailbox service 726, an instant messaging store 728, or a social networking site 730. By way of example, a prediction module 560, a tracking module 562, and/or an intent module 564 may be implemented in a general computing device 704, a tablet computing device 706 and/or a mobile computing device 708 (e.g., a smart phone). In some embodiments, the server 702 is configured to implement a prediction module 560, a tracking module 562, and/or an intent module 564, via the network 715.

Figure 8:
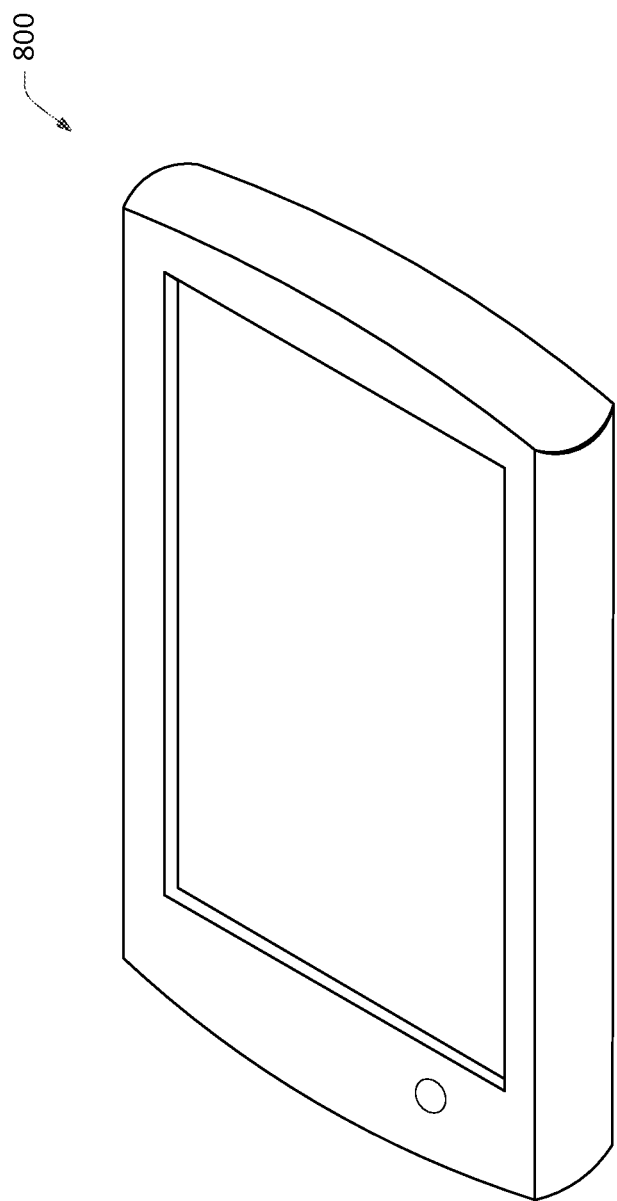
FIG. 8 illustrates a tablet computing device with which embodiments of the present disclosure may be practiced.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In some embodiments, a method for contextual language understanding is provided. The method includes receiving a first natural language input from first data from a user device and determining a first prediction utilizing a schema based on the first natural language input. The method further includes receiving a first response based on the first prediction from second data from the user device and determining a second prediction utilizing the schema based on the first response. This method further includes receiving a second natural language input from third data from the user device and determining a third prediction utilizing the schema based on the second natural language input. The method also includes comparing the third prediction to any previous prediction to select carryover entities from at least the first and the second predictions and combining the third prediction and the carryover entities to produce a final prediction of the second natural language input. Additionally, the method includes generating a second response based on the final prediction of the second natural language input and sending the second response to the user device for performance of the second response.

In some embodiment, a system is provided. The system includes at least one processor and a memory. The memory encodes computer executable instruction that, when executed by the at least one processor, cause the at least one processor to perform a method for contextual language understanding. The method for contextual language understanding includes receiving a first natural language input and identifying a first set of entities in the first natural language input utilizing a schema with a prediction system. The method further includes receiving a first response to the first natural language input based on the first set of entities and identifying a second set of entities in the first response utilizing the schema with the prediction system. The method also includes receiving a second natural language input and identifying a third set of entities in the second natural language input utilizing the schema with the prediction system. Additionally, the method includes identifying a first set of carryover entities from any previous set of entities for carryover based on the third set of entities with a tracking system. Further, the method includes determining a first user intent based on the third set of entities and the first set of carryover entities with an intent system and generating a second response based on the first user intent with the intent system.

In further embodiments a system is provided. The system comprises a prediction system, a tracking system, and an intent system. The prediction system identifies entities in received data utilizing a common schema. The data includes natural language inputs and responses. The tracking system determines that an entity from a previous turn should carry over to a current turn of a conversation based on the entities from the current turn to form carryover entities. The intent system determines a user intent based on the carryover entities and the entities from the current turn and generates a current response based on the user intent.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary embodiments were provided so that this disclosure was thorough and complete and fully conveyed the scope of the other possible embodiments to those skilled in the art. For example, aspects of the various embodiments disclosed herein may be modified and/or combined without departing from the scope of this disclosure.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

The invention claimed is:
1. A system comprising:
at least one processor; and
a memory encoding computer executable instruction that, when executed by the at least one processor, cause the at least one processor to perform a method for contextual language understanding, the method comprising:

receiving a first natural language input based on input from a first user;
identifying a first set of entities in the first natural language input utilizing a schema;
receiving a first response to the first natural language input based on the first set of entities,
wherein the first response is generated by the system;
identifying a second set of entities in the first response utilizing the schema;
receiving a second natural language input;
identifying a third set of entities in the second natural language input utilizing the schema;
identifying a first set of carryover entities from any previous set of entities for carryover based on the third set of entities;
determining a first user intent based on the third set of entities and the first set of carryover entities; and
generating a second response based on the first user intent.

2. The system of claim 1, wherein the first natural language input is at least one of a spoken language input or a textual input.

3. The system of claim 1, wherein the system is a user device,
wherein the first response is a first action performed by the user device in order to answer the first natural language input, and
wherein the second response is a second action performed by the user device in order to answer the second natural language input,
wherein the first set of carryover entities does not contain any entities from the first set of entities.

4. The system of claim 1, wherein the system is a user device, and
wherein the second natural language input is received from additional input from the first user, and
wherein the second response is generated by the user device.

5. The system of claim 1, wherein the system is a user device, and
wherein the user device is at least one of:
a mobile telephone;
a smart phone;
a tablet;
a phablet;
a smart watch;
a wearable computer;
a personal computer;
a desktop computer;
a gaming system; or
a laptop computer.

6. The system of claim 1, wherein the method further comprises:
sending the second response to a user device for performance of the second response,
wherein the system is a server in communication with the user device.

7. The system of claim 6, wherein the first natural language input and the second natural language input is received from first data from the user device, and
wherein the first response is received from second data from the user device.

8. The system of claim 6, the method further comprising:
determining a second user intent based on the first set of entities;
generating the first response based on the second user intent, and
wherein the first natural language input and the second natural language input is received from data from the user device, and
wherein the first response is received after the first response is generated by the server.

9. The system of claim 1, the method further comprising:
identifying a fourth set of entities in the second response utilizing the schema;
receiving a third natural language input,
identifying a fifth set of entities in the third natural language input utilizing the schema,
identifying a second set of carryover entities from any of the previous set of entities for, wherein the previous set of entities now include the third set of entities and the fourth set of entities, for carry over based on the fifth set of entities;
determining a second user intent based on the fifth set of entities and the second set of carryover entities; and
generating a third response based on the second user intent.

10. The system of claim 1, wherein the system is running a specific application, the specific application is at least one of:
a digital assistant application;
a voice recognition application;
an email application;
a social networking application;
a collaboration application;
an enterprise management application;
a messaging application;
a word processing application;
a spreadsheet application;
a database application;
a presentation application;
a contacts application;
a gaming application;
an e-commerce application;
an e-business application;
a transactional application;
an exchange application; or
a calendaring application.

11. A system comprising:
a prediction system, the prediction system identifies entities in received data utilizing a common schema,
wherein the data include natural language inputs and responses, and
wherein the responses are generated by the system and the natural language inputs are based on input from a user;
a tracking system, the tracking system compares entities from a previously generated response and a previously received natural language input to the entities from the current turn and determines whether an entity from at least one of the previously generated response and the previously received natural language input should carry over to a current turn of a conversation based on this comparison to form a first set of carryover entities; and
an intent system, the intent system determines a user intent based on the first set of carryover entities and the entities from the current turn and generates a current response based on the user intent.

12. The system of claim 11, wherein the natural language inputs include at least one of a spoken language input or a textual input.

13. The system of claim 11, wherein the responses are actions performed by a user device in order to answer the natural language inputs.

14. The system of claim 11, wherein the system is a user device.

15. The system of claim 14, wherein the user device is at least one of:
a mobile telephone;
a smart phone;
a tablet;
a phablet;
a smart watch;
a wearable computer;
a personal computer;
a desktop computer;
a gaming system; or
a laptop computer.

16. The system of claim 11, wherein the system is server in communication with a user device.

17. The system of claim 16, wherein the natural language inputs are received from first data from the user device, and
wherein the responses are received from both second data from the user device and from the server generation of responses.

18. The system of claim 11, wherein the prediction system utilizes a knowledge backend.

19. The system of claim 11, wherein each entity relates to a word, a term or a phrase from within the natural language inputs and the responses, and
wherein the first set of carryover entities does not include any entities from the natural language input and the previously generated response.

20. A method for contextual language understanding, the method comprising:
receiving a first natural language input as first data based on input from a first user from a user device;
determining, by the server, a first prediction utilizing a schema based on the first natural language input;
receiving a first response based on the first prediction as second data from the user device, wherein the first response is generated by one of the server or the user device;
determining, by the server, a second prediction utilizing the schema based on the first response;
receiving a second natural language input as third data from the user device;
determining, by the server, a third prediction utilizing the schema based on the second natural language input;
comparing the third prediction to any previous prediction to select carryover entities from at least the first and the second predictions;
combining the third prediction and the carryover entities to produce a final intent prediction of the second natural language input;
generating, by the server, a second response based on the final intent prediction of the second natural language input; and
sending, by the server, the second response to the user device for performance of the second response.

* * * * *